United States Patent [19]

Reubke et al.

[11] 4,382,034
[45] May 3, 1983

[54] PROCESS FOR THE PREPARATION OF DIANTHRAQUINONYLAMINES

[75] Inventors: Karl-Julius Reubke; Josef Stawitz, both of Cologne, Fed. Rep. of Germany

[73] Assignee: Bayer Aktiengesellschaft, Leverkusen, Fed. Rep. of Germany

[21] Appl. No.: 301,692

[22] Filed: Sep. 14, 1981

[30] Foreign Application Priority Data

Sep. 26, 1980 [DE] Fed. Rep. of Germany ....... 3036374

[51] Int. Cl.³ .............................................. C07C 97/24
[52] U.S. Cl. ..................................... 260/367; 260/368
[58] Field of Search .............................. 260/367, 368

[56] References Cited

U.S. PATENT DOCUMENTS

| 1,834,876 | 12/1931 | Smith | 260/367 |
| 2,113,231 | 4/1938 | Deinet | 260/367 |
| 3,565,923 | 2/1971 | Grelat et al. | 260/367 |
| 3,718,669 | 2/1973 | Gerson | 260/367 |

FOREIGN PATENT DOCUMENTS 201327  11/1907  Fed. Rep. of Germany .

OTHER PUBLICATIONS

Chemical Abstracts, Band 77, Nr. 18,30, Oct. 1978, Seite 89, Zusammenfassung 116043k, Columbus, Ohio (U.S.) & CS-A-143 035, (J. Arient et al.), Oct. 15, 1971.

*Primary Examiner*—Charles F. Warren
*Assistant Examiner*—Raymond Covington
*Attorney, Agent, or Firm*—Sprung, Horn, Kramer & Woods

[57] ABSTRACT

Process for the preparation of dianthraquinonylamines, characterized in that an optionally substituted nitroanthraquinone is reacted with an optionally substituted aminoanthraquinone in the presence of a basic-reacting alkaline earth metal compound at an elevated temperature.

8 Claims, No Drawings

PROCESS FOR THE PREPARATION OF DIANTHRAQUINONYLAMINES

The invention relates to a process for the preparation of dianthraquinonylamines by reaction of nitroanthraquinones with aminoanthraquinones in the presence of basic alkaline earth metal compounds.

Dianthraquinonylamines have been customarily prepared by reaction of halogenoanthraquinones with aminoanthraquinones, under catalysis by copper, according to the Ullmann reaction (Ullmanns Enzyklopädie der technischen Chemie (Ullmanns Encyclopaedia of Industrial Chemistry), Volume 7, page 585, 3rd Edition, (1974)). The required chloroanthraquinones are prepared from the sulpho acids. On transition to the anthraquinone nitration, a process would be desired which allows the preparation of the dianthraquinonylamines, which are important as intermediate products for vat dyes, directly from the nitroanthraquinones, without taking the indirect route via the chloro derivatives.

It is known that nitroanthraquinones can be condensed, under catalysis by copper, with aminoanthraquinones, in a similar manner to chloroanthraquinones, to give anthraquinonylamines (J. Soc. Chem. Ind. Jap. 43, 386 B (1940); Ind. J. Chem. 14B, 171 (1976)), the yields, however, being substantially lower than those obtained when chloroanthraquinones are employed. The substantially lower readiness to react of the nitroanthraquinones in the reaction with aminoanthraquinones under catalysis by copper can be seen, inter alia, from the fact that anthraquinone compounds which carry nitro-as well as halogeno-substituents may be reacted, according to this process, to give the nitro-group-substituted dianthraquinonylamines (see the preparation of 5-nitro-1,1'-dianthraquinonylamine in CS-PS (Czechoslovak Patent Specification) No. 143,035). According to an older Patent (DE-PS (German Patent Specification) No. 201,327), the preparation of dianthraquinonylamines from nitroanthraquinones and aminoanthraquinones is also successful using alkali metal carbonates in nitrobenzene, without catalysis by copper; the yields and qualities of the products thus obtained are, however, not sufficient for an industrial application.

The new process for the preparation of dianthraquinonylamines is characterised in that an optionally substituted nitroanthraquinone is reacted with an optionally substituted aminoanthraquinone in the presence of a basic-reacting alkaline earth metal compound at an elevated temperature. The reaction is preferably carried out in the presence of a solvent or diluent. Furthermore, the reaction is preferably carried out in the absence of copper or copper compounds.

Nitroanthraquinones of the formula

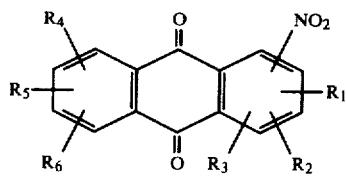

in which $R_1$, $R_2$, $R_3$, $R_4$ and $R_5$ designate hydrogen, halogen, arylamino or acylamino, and $R_6$ designates hydrogen, nitro, halogen, arylamino or acylamino, and aminoanthraquinones of the formula

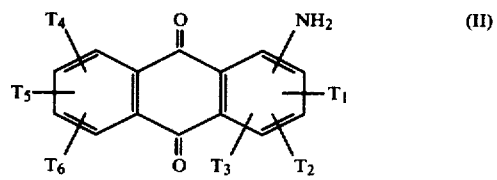

in which $T_1$, $T_2$, $T_3$, $T_4$, $T_5$ and $T_6$ designate hydrogen, amino, halogen, arylamino or acylamino, are preferably employed in the process according to the invention.

Halogen preferably represents chlorine, bromine or fluorine, and arylamino preferably represents phenylamino, naphthylamino and anthraquinonylamino, and these radicals can be substituted, for example, by trifluoromethyl, $C_1$–$C_6$-alkyl, $C_1$–$C_6$-alkoxy, nitro, chlorine, bromine and fluorine. Acylamino preferably represents $C_1$–$C_6$-alkylcarbonylamino or benzoylamino, which can be substituted, for example, by trifluoromethyl, $C_1$–$C_6$-alkyl, $C_1$–$C_6$-alkoxy, nitro, chlorine, bromine and fluorine.

Unsubstituted nitroanthraquinones or unsubstituted aminoanthraquinones as well as nitroanthraquinones or aminoanthraquinones which carry a substituent are preferably employed in the new process.

Nitroanthraquinones of the formula

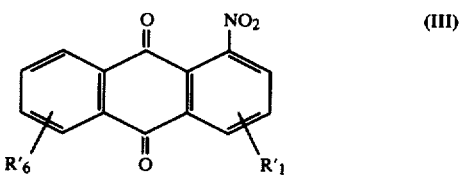

in which $R_1'$ designates hydrogen or acylamino and $R_6'$ designates hydrogen, nitro or acylamino, are particularly preferably employed in the process according to the invention, and acylamino preferably represents benzoylamino. Examples which may be mentioned are: 1-nitro-, 1,5-dinitro-, 1,8-dinitro-, 1,7-dinitro-, 1,6-dinitroanthraquinone and 1-nitro-4-, 1-nitro-5- and 1-nitro-8-acylaminoanthraquinone.

Furthermore, aminoanthraquinones of the formula

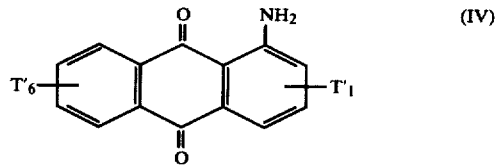

in which $T_1'$ and $T_6'$ designate hydrogen, amino or acylamino, in particular benzoylamino are preferably employed in the process according to the invention.

Examples which may be mentioned are: 1-amino-, 1,4-diamino-, 1,5-diamino- and 1,8-diaminoanthraquinone, and 1-amino-4-benzoylamino-, 1-amino-5-benzoylamino- and 1-amino-8-benzoylaminoanthraquinone.

The molar ratio of optionally substituted nitroanthraquinone to optionally substituted aminoanthraquinone can be varied within wide limits; the reaction is preferably effected in the molar ratio of 0.8:1 to 1.5:1.

The alkaline-reacting compounds of the alkaline earth metals used for the new process are the oxides and hydroxides as well as the basic salts. The oxides, hydroxides and carbonates, such as, for example, MgO, $Ca(OH)_2$ and $CaCO_3$, are preferably employed; CaO is preferably employed.

The quantity of the alkaline-reacting alkaline earth metal compound employed in the process is variable within wide limits. Quantities of about 0.5 to about 20 mols are preferably employed, and quantities of about 1 mol to about 10 mols are particularly preferably employed, per mol of the optionally substituted nitroanthraquinone.

The reaction according to the invention can be carried out, for example, in containers with stirrers, at normal pressure or, if a solvent with a boiling point below the selected reaction temperature is used, under an elevated pressure of up to 30 bars. The reaction can also be advantageously carried out in a paddle drier or in another apparatus which mixes well and can be heated. A continuous procedure can also be carried out, in which an intimate mixture of the reaction components, in the presence of solid or liquid diluents, is continuously fed through a zone which is maintained at the reaction temperature.

The reaction temperature is preferably between about 190° C. and about 260° C., particularly preferably between 200° and 230° C. The reaction time depends on the reaction temperature selected and on the reactivity of the nitro compound employed, and is between 1 and 30 hours. Reaction times of from 3 to 20 hours are preferred, and the temperature is accordingly selected for the period given.

The starting materials can be added together at 20° to 200° C. and can then be heated to reaction temperature, or the optionally substituted aminoanthraquinone and the alkaline-reacting compound, if appropriate in the solvent or diluent, are brought to the reaction temperature, and the optionally substituted nitroanthraquinone is added to the mixture continuously or in portions.

The addition is effected in the course of 0.5 to 3 hours. The reaction mixture is then further stirred at the reaction temperature, until the starting components can no longer be detected, or cannot be detected in amounts greater than in the standard, for example, by thin layer chromatography or IR spectroscopy.

Particularly suitable solvents or diluents for the process according to the invention are those which are largely inert under the reaction conditions. Solvents which dissolve the organic reaction partners in sufficient quantity are particularly employed. Aromatic, hydroaromatic or heteroaromatic hydrocarbons, which can be substituted, for example, by halogen, nitro or lower alkyl groups, as well as diaryl ethers and sulphones, are preferred solvents and diluents.

Examples of suitable aromatic and hydroaromatic hydrocarbons are: toluene, o-, m- and p-xylene, isopropylbenzene, trimethylbenzene, benzene, diethylbenzene, tetramethylbenzene, di-isopropylbenzene, isododecylbenzene, tetralin, decalin, naphthalene, methylnaphthalene, diphenyl, diphenylmethane, o-, m- and p-cymene, dibenzyl, dihydronaphthalene, 2,2'-dimethyldiphenyl, 2,3-dimethyl-diphenyl, 2,4'-dimethyldiphenyl, 3,3'-dimethyldiphenyl, 1,2-dimethyl-naphthalene, 1,4-dimethylnaphthalene, 1,6-dimethylnaphthalene, 1,7-dimethylnaphthalene, 1,1-diphenylethane, hexamethylbenzene, isoamylbenzene, pentamethylbenzene, 1,2,3,4-tetramethylbenzene, 1,2,3,5-tetramethylbenzene, 1,2,7-trimethylnaphthalene, 1,2,5-trimethylnaphthalene, chlorobenzene, o-dichlorobenzene, trichlorobenzene, chlorotoluene, nitrobenzene and diphenyl ether.

Suitable heteroaromatic hydrocarbons are aromatic nitrogen bases, such as, for example, pyridine, methylpyridine, dimethylpyridine, trimethylpyridine, quinoline and methylquinoline.

The high-boiling solvents, such as, for example, naphthalene, chloronaphthalene and quinoline, are preferably employed.

The solvent is preferably used in a quantity of from 0.5 to 10 parts by weight, relative to the optionally substituted aminoanthraquinone employed. The quantity depends upon the procedure chosen, for example, in carrying out the reaction in a paddle drier, in the form of a caked melt, only quantities of from 0.5 to 5 parts by weight are required.

The working-up is effected according to processes which are in themselves known, for example, by distilling off the solvent, if appropriate under reduced pressure, or by filtration, if appropriate after dilution with a suitable solvent. Suitable diluents are those solvents which are miscible with the solvent used for the reaction and which, in general, have a relatively low boiling point. The alcohols with 1 to 5 C atoms, hydrocarbons with 5 to 10 C atoms and halogenated hydrocarbons may be particularly mentioned. The diluent is chosen in such a way that it can easily be recovered by fractional distillation. A preferred embodiment of the process according to the invention may be described below with reference to the preparation of 1,1'-dianthraquinonylamine.

10 parts by weight of 1-aminoanthraquinone and 5–15 parts by weight of CaO are introduced into 40 to 200 parts by weight of naphthalene or chloronaphthalene at 20° to 150° C. After the mixture has been heated to 190° to 210° C., 12 to 14 parts by weight of 1-nitroanthraquinone are introduced in small portions in the course of from 0.5 to 3 hours. The mixture is then further stirred for 2 to 10 hours at 200° to 230° C. After the end of the reaction, which can be determined, for example, by thin layer chromatography, the reaction mixture is diluted with a suitable solvent, for example, toluene, at 100° to 150° C. The quantity of toluene added is variable within wide limits, and is, for example, 0.5 to 10 parts, relative to the naphthalene or chloronaphthalene employed. After the dilution of the reaction mixture, the latter is filtered off under suction, either still warm or after it has cooled, and the product is freed from adhering organic solvent by drying.

The caked filter residue is then pounded in water, and is heated under reflux after addition of from 1 to 3 mols of ammonium chloride, relative to calcium oxide employed. The mixture is then boiled under reflux until nitrite is no longer detectable. If necessary, in order to accelerate the reaction, 5 to 10% strength hydrochloric acid is allowed to run into the mixture during this process, or concentrated hydrochloric acid is added through the condenser, during the process, in such a manner that it is diluted by the distillate and, in this way, the formation of nitrous gases is avoided.

The process according to the invention makes possible the preparation of dianthraquinonylamines, without taking the indirect route via the chloroanthraquinones, and offers further surprising advantages. Thus, the dianthraquinonylamines are obtained in good yields. Further, the process makes possible the preparation of chloro-substituted dianthraquinonylamines, since, when chloro- and nitro-substitutes are simultaneously present in the anthraquinone molecule, the nitro group reacts selectively.

EXAMPLE 1

10 g of 1-aminoanthraquinone (98% strength) and 10 g of finely-powdered calcium oxide are introduced into 40 g of naphthalene at 130° C. After the mixture has been heated to 200° C., 13 g of 1-nitroanthraquinone (98% strength) are added in small portions in the course of 3 hours. The mixture is stirred for another 4 hours at 200° C., and the melt is cooled to 130° C. and is diluted with 80 ml of toluene, and the mixture is filtered off under suction at exactly 60° C. The dried, ground crude product is introduced into a solution of 10 g of ammonium chloride in 600 ml of water, and the mixture is heated under reflux and slowly acidified with 10% strength hydrochloric acid. The mixture is then filtered off under suction while hot, and the residue is washed with water and dried at 100° C. Yield: 20.6 g of 79% strength dianthraquinonylamine, corresponding to 86.2% of theory.

EXAMPLE 2

16 g of 1-chloro-5-nitroanthraquinone (88% strength) is introduced in small portions into a mixture of 10 g of 1-aminoanthraquinone (98% strength) and 10 g of calcium oxide in 60 g of naphthalene at 200° C. in the course of 2 hours. After 6 hours at 200° C., the mixture is allowed to cool to 130° C., diluted with 100 ml of toluene and filtered off under suction at exactly 90° C. The dry caked filter residue is introduced into a solution of 10 g of ammonium chloride in 600 ml of water, and the mixture is heated under reflux and slowly acidified with 10% strength hydrochloric acid. The suspension is filtered off under suction while hot, and is washed with water. After drying at 100° C.: 23.2 g of crude product. After the crude product has been stirred up with 90° C. hot toluene and has been dried at 100° C.: 19.6 g of 5-chloro-1,1'-dianthraquinonylamine (81% strength), corresponding to 77.9% of theory, are obtained.

EXAMPLE 3

A mixture of 10.3 g of 1-amino-5-benzoylaminoanthraquinone (90% strength) and 10 g of calcium oxide in 80 ml of 1-chloronaphthalene is heated to 200° C. 12.4 g of 5-benzoylamino-1-nitroanthraquinone (90% strength) are now introduced in the course of 1 hour. Then mixture is then stirred for 6 hours at 210° C. After the mixture has been cooled to 120° C., it is diluted with 80 ml of toluene and filtered off under suction, and the residue is washed with toluene and dried. The dry caked filter residue is introduced into a solution of 10 g of ammonium chloride in 500 ml of water, and the mixture is heated under reflux and slowly acidified with 10% strength hydrochloric acid. After filtration under suction, washing and drying, 20.1 g of 78.3% strength 5,5'-dibenzoylamino-1,1'-dianthraquinonylamine are obtained.

EXAMPLE 4

250 ml of quinoline, 100 g of 1-aminoanthraquinone and 25 g of CaO are warmed to 200° to 210° C. in a 1 l sulphonation beaker with an anchor stirrer and short-path distillation bridge. 120 g of 1-nitroanthraquinone are added in portions in the course of 2 hours, and the mixture is then stirred for another 5 hours at 200° to 210° C. The mixture is allowed to cool to 120° C., and is diluted slowly and under reflux with 500 ml of ethanol. The mixture is then filtered off under suction, and the residue is washed with ethanol and dried. The dry caked filter residue is heated under reflux in 1 l of water with 100 g of ammonium chloride, and is acidified slowly through the reflux condenser with concentrated hydrochloric acid. After filtering off the mixture under suction, washing the residue until the runnings are neutral, and drying, 190.4 g of 80.4% strength 1,1'-dianthraquinonylamine are obtained.

We claim:

1. Process for the preparation of dianthraquinonylamines, characterised in that an optionally substituted nitroanthraquinone is reacted with an optionally substituted aminoanthraquinone in the presence of calcium oxide at an elevated temperature and in the absence of copper or copper compounds.

2. Process according to claim 1, characterised in that the reaction is carried out in the presence of a solvent or diluent from the series of aromatic, hydroaromatic or heteroaromatic hydrocarbons, which can be substituted by halogen, nitro or lower alkyl groups, and sulphones.

3. Process according to claim 1, characterised in that the reaction is carried out in the presence of quinoline, naphthalene or chloronaphthalene.

4. Process according to claim 1, characterised in that nitroanthraquinones of the formula

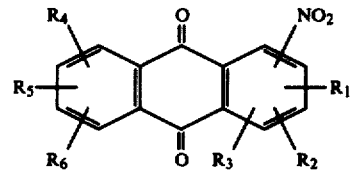

in which
$R_1$, $R_2$, $R_3$, $R_4$ and $R_5$ designate hydrogen, halogen, acylamino or arylamino, and
$R_6$ designates hydrogen, nitro, halogen, acylamino or arylamino,
are employed.

5. Process according to claim 1, characterised in that aminoanthraquinones of the formula

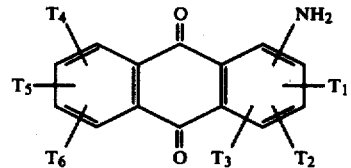

in which
$T_1$, $T_2$, $T_3$, $T_4$, $T_5$ and $T_6$ designate hydrogen, amino, halogen, arylamino or acylamino,
are employed.

6. Process according to claims 1, 2 or 5, characterised in that nitroanthraquinones of the formula

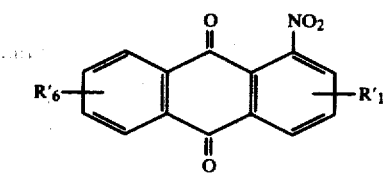

in which
- R$_1'$ designates hydrogen or acylamino, in particular benzoylamino, and
- R$_6'$ designates hydrogen, nitro or acylamino, in particular benzoylamino, are employed.

7. Process according to claim 6, characterised in that aminoanthraquinones of the formula

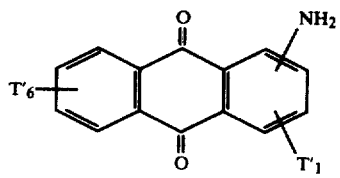

in which
- T$_1'$ and T$_6'$ designate hydrogen, amino or acylamino, in particular benzoylamino, are employed.

8. Process according to claims 1 or 2, characterised in that the reaction is carried out at temperatures between about 190° C. and about 260° C.

* * * * *